Figure 1:
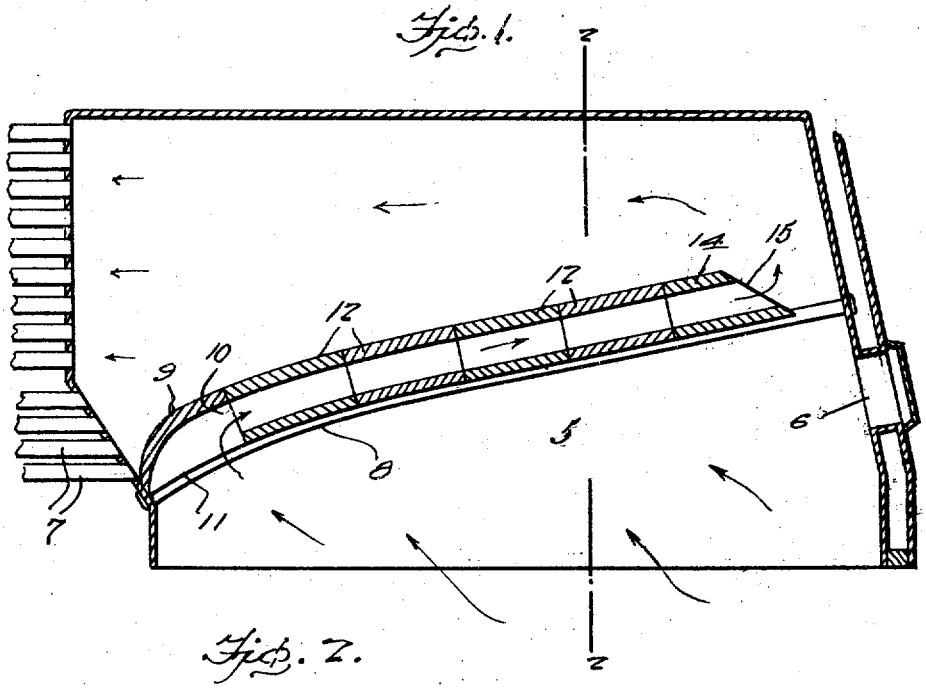

Sept. 25, 1928. Re. 17,088

R. M. SPENCER

FIRE BOX FOR BOILERS

Original Filed July 20, 1926

Inventor
R. M. Spencer

By Clarence A. O'Brien
Attorney

Reissued Sept. 25, 1928. Re. 17,088

UNITED STATES PATENT OFFICE.

ROBERT MARVIN SPENCER, OF WAYCROSS, GEORGIA.

FIRE BOX FOR BOILERS.

Original No. 1,622,356, dated March 29, 1927, Serial No. 123,708, filed July 20, 1926. Application for reissue filed March 22, 1928. Serial No. 263,822.

This invention is designed to effect a perfect combustion of the fuel in the fire box, whereby waste of heat and fuel will be reduced to a minimum and the consumption of the smoke effected before it leaves the fire box; and it consists in certain novel features of construction that will be fully hereinafter described and particularly claimed.

In the drawing:—

Figure 2:
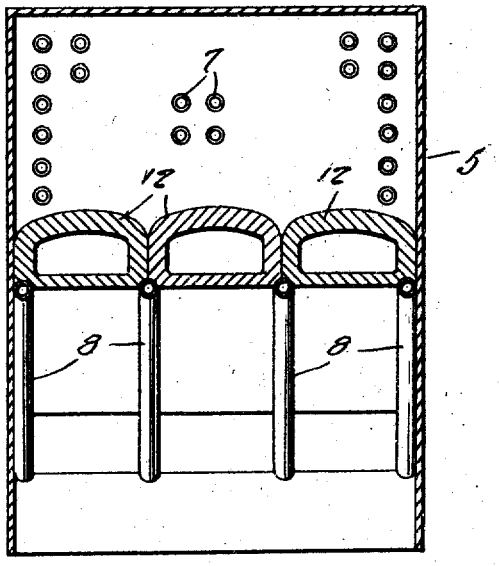
Figure 3:
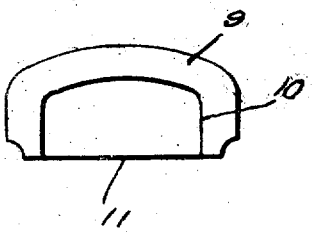

Figure 1 represents a vertical sectional view of the fire box of a boiler furnace, Figure 2 is a transverse sectional view thereof, and Figure 3 is an end elevation of one of the forward hollow blocks.

Referring to the drawing in detail, it will be seen that the numeral 5 designates the fire box of the boiler which is provided with the usual doorway 6 through the water space of the boiler.

From the forward end of the fire box the usual fire flues 7 extend through which the products of combustion pass on their way into the smoke stack.

In the bottom of the fire box, is a grate (not shown), which may be of any preferred or desirable construction. Arranged entirely within the fire box between the grate and the fire flues are a plurality of pipes 8 forming an arch support. The arch is formed in three sections which are similar in construction and, therefore, only one section will be described in detail.

Each section includes a forward end hollow block 9 which has one end open at 10 and its bottom open as at 11. The intermediate hollow blocks 12 have both ends opened and are closed at their sides, tops and bottoms. The rear end block 14 has its ends opened and its rear end is beveled as is indicated at 15, and is disposed in spaced relation to the rear wall of the fire box. The sides, top and bottom of this block 14 are closed.

The blocks 9, 12 and 14 have their bottom corners notched longitudinally to receive the arch pipes 8. The arch pipes communicate with the water space around the fire box. The water in these arch pipes prevents them from being overheated which is essential as otherwise the weight of the arch would cause the pipes to bend and sag when subjected to the usual intense heat in the fire box.

In operation, it will be observed, all of the smoke and gases of combustion are compelled to pass to the forward end of the fire box and then up through the flues formed by the arch sections before entering the fire flues. The gas, which is preferably forced in under pressure, entering the flues from the forward ends of the arch sections, is heated while passing through the arch, thereby consuming the smoke and gases.

It is to be noted that this arch structure may be made very cheaply and yet strong and durable. The structure is exceedingly simple, yet efficient and reliable. The present embodiment of the invention, however, has been disclosed in detail merely by way of example because in actual practice it attains the features of advantages enumerated as desirable in the statement of the invention and the above description.

It is apparent that changes in the details of construction, and in the combination and arrangement of parts may be resorted to without departing from the spirit or scope of the invention as hereinafter claimed or sacrificing any of its advantages.

Having thus described my invention, what I claim as new is:

In combination with a boiler fire box, longitudinally extending arch pipes between the fire containing portion of the fire box and the fire flues thereof, a plurality of arch sections of hollow construction mounted on said arch pipes, each section including a plurality of hollow blocks, the intermediate blocks being open ended, and the front block having one open end adjacent the next intermediate block and an open bottom, and the other end block having open ends one of which is beveled.

ROBERT M. SPENCER.